(12) United States Patent
Schnyder et al.

(10) Patent No.: US 8,928,729 B2
(45) Date of Patent: Jan. 6, 2015

(54) SYSTEMS AND METHODS FOR CONVERTING VIDEO

(75) Inventors: Lars Schnyder, Dietikon (CH); Oliver Wang, Zurich (CH); Aljoscha Aleksej A. Smolic, Zurich (CH)

(73) Assignee: Disney Enterprises, Inc., Burbank, CA (US)

(*) Notice: Subject to any disclaimer, the term of this patent is extended or adjusted under 35 U.S.C. 154(b) by 397 days.

(21) Appl. No.: 13/229,048

(22) Filed: Sep. 9, 2011

(65) Prior Publication Data

US 2013/0063549 A1 Mar. 14, 2013

(51) Int. Cl.
H04N 13/02 (2006.01)

(52) U.S. Cl.
CPC .................. H04N 13/0264 (2013.01)
USPC ................................ 348/36; 348/43

(58) Field of Classification Search
None
See application file for complete search history.

(56) References Cited

U.S. PATENT DOCUMENTS

| | | | |
|---|---|---|---|
| 5,850,352 A * | 12/1998 | Moezzi et al. | 345/419 |
| 6,791,598 B1 * | 9/2004 | Luken et al. | 348/36 |
| 7,054,478 B2 * | 5/2006 | Harman | 382/154 |
| 7,619,658 B2 * | 11/2009 | Baker et al. | 348/218.1 |
| 8,077,964 B2 * | 12/2011 | Berestov et al. | 382/154 |
| 8,411,931 B2 * | 4/2013 | Zhou et al. | 382/154 |
| 8,488,868 B2 * | 7/2013 | Tam et al. | 382/154 |
| 2002/0140829 A1 * | 10/2002 | Colavin et al. | 348/231.99 |
| 2004/0041981 A1 * | 3/2004 | Werner | 352/92 |
| 2011/0069152 A1 * | 3/2011 | Wang et al. | 348/43 |
| 2011/0096832 A1 * | 4/2011 | Zhang et al. | 375/240.08 |
| 2012/0013711 A1 * | 1/2012 | Tamir et al. | 348/46 |
| 2012/0287233 A1 * | 11/2012 | Wang et al. | 348/42 |

OTHER PUBLICATIONS

Ashutosh Saxena et al., "Make3D: Learning 3D Scene Structure from a Single Still Image", Computer Science Department, no date, 16pgs.
Marcel Germann et al., "Articulated Billboards for Video-based Rendering", Journal compilation Copyright The Eurographics Association and Blackwell Publishing Ltd., 2010, vol. 29 (2010), No. 2, 10pgs.
Jianbo Shi and Carlo Tomasi, "Good Features to Track", National Science Foundation, IRI-9201751, 1063-6919/94, Copyright 1994 IEEE, (pp. 593-600, 8pgs. total).
Corinna Cortes and Vladimir Vapnik, "Support-Vector Networks", (no date), AT&T Labs-Research, USA, (pp. 1-31, total 31pgs.)

* cited by examiner

*Primary Examiner* — Sath V Perungavoor
*Assistant Examiner* — Janese Duley
(74) *Attorney, Agent, or Firm* — Buckley, Maschoff & Talwalker LLC

(57) ABSTRACT

According to some embodiments, systems, methods, apparatus and computer program code for converting 2D video data to 3D video data includes receiving a two dimensional (2D) video feed from a video camera, the feed including a set of image frames, the frames together forming a panorama image, generating a background depth map, extracting for each of the image frames a set of image frame depth maps from the background depth map, generating an updated depth map using the set of image frame depth maps and the background depth map, and rendering an output image, the output image based on the panorama image and the updated depth map, the output image and the panorama image together forming a stereoscopic image pair.

18 Claims, 8 Drawing Sheets

SYSTEMS AND METHODS FOR CONVERTING VIDEO

FIELD

The present invention relates to systems and methods for converting video. More particularly, some embodiments relate to systems and methods for automatically converting two dimensional (2D) video to three dimensional (3D) video.

BACKGROUND

Three dimensional (3D) videos, also known as stereoscopic videos, are videos that enhance the illusion of depth perception. 3D movies have existed in some form since the 1950s, but 3D-at-home has only recently begun to gain popularity. One bottleneck inhibiting its adoption is that there is not yet a sufficient amount of suitable 3D content available and few live broadcasts are viewable in 3D. This is because the creation of stereoscopic content is still a very expensive and difficult process. Filming in 3D requires highly trained stereographers, expensive stereo rigs, and redesign of existing monoscopic content work-flows. As a result, techniques for converting 2D content into 3D are required, both for new productions as well as conversion of existing legacy footage.

The general problem of creating a high quality stereo pair from monoscopic input is highly under-constrained. The typical conversion pipeline consists of estimating the depth for each pixel, projecting them into a new view, and then filling in holes that appear around object boundaries. Each of these steps is difficult and, in the general case, requires large amounts of manual input, making it unsuitable for live broadcast. Existing automatic methods cannot guarantee quality and reliability as necessary for television (TV) broadcast applications.

Converting stereoscopic video from monoscopic video for live or existing broadcast data is a difficult problem, as it requires the use of a view synthesis technique to generate a second view, which closely represents the original view. One reason why the conversion is difficult is that it requires some knowledge of scene depth. As a result, existing conversion methods use either some form of manual input (such as user-specified normal, creases and silhouettes), manual tracing of objects at key frames in a video, or some prior scene knowledge.

Some methods of automatic stereoscopic video conversion from monoscopic video typically work by reconstructing a dense depth map using parallax between frames, or structure from motion. Unfortunately, however, these methods require static scenes and specific camera paths, and in cases where parallax does not exist in a video sequence, such as with a rotating camera, these methods would not work.

It would be desirable to provide automated conversion techniques which produce high quality stereoscopic video from monoscopic video inputs without the need to assume static content.

DETAILED DESCRIPTION

Figure 1:
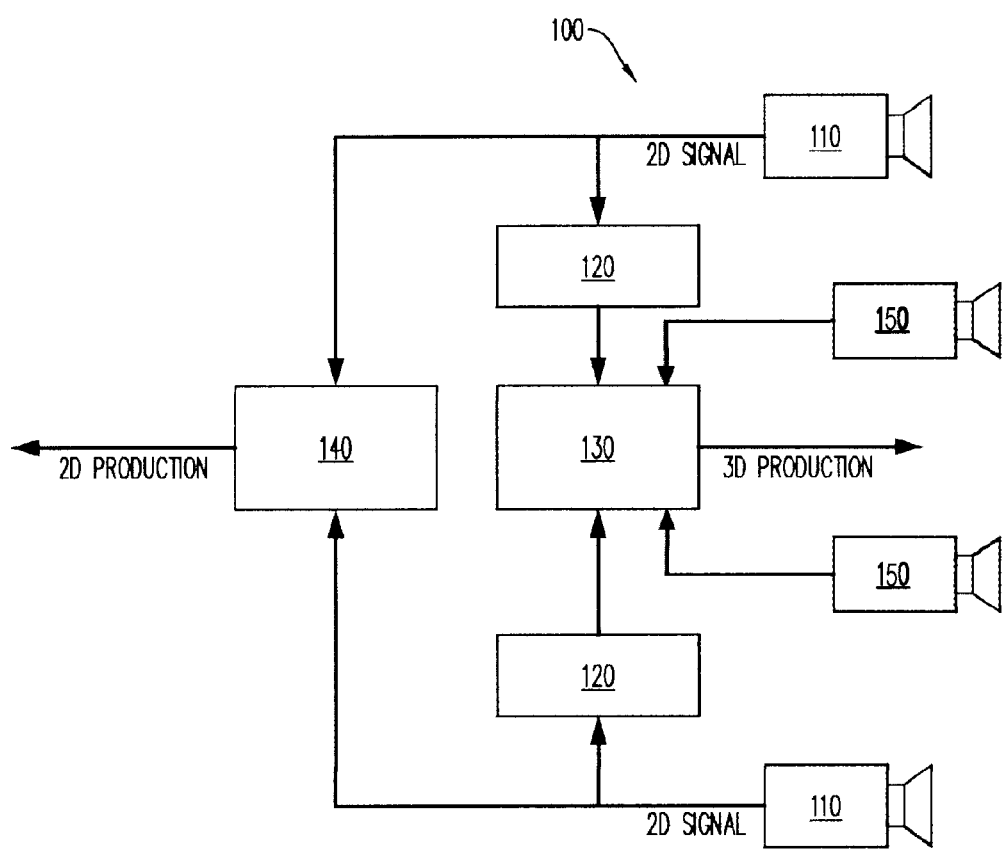
FIG. 1 illustrates a system in accordance with some embodiments of the present invention.

Applicants have recognized that there is a need for methods, systems, apparatus, means and computer program products to efficiently convert two dimensional video data into three dimensional video data for broadcast or other delivery or transmission of the video data (e.g., including for pre-production, generally referred to herein as "broadcast"). Pursuant to some embodiments, the conversion techniques described herein are believed to be particularly desirable for use in conjunction with live production of events that include more than one video camera capturing two dimensional video data. For example, embodiments are well suited for use in live-production of sporting events, although those skilled in the art will appreciate, upon reading the following disclosure, that embodiments can be used with desirable results for converting two dimensional video data to three dimensional data for production of a wide variety of events or programs. For clarity and ease of exposition, embodiments will be described using an illustrative example in which the broadcast program to be produced is a live sporting event broadcast. In particular, the live sporting event is a soccer match, and at least two video cameras are provided at known locations at the soccer match. Those skilled in the art, upon reading this disclosure, will appreciate that the example is illustrative and is not intended to be limiting, as features of embodiments of the present invention may be used in conjunction with the production of broadcasts of a wide variety of events and programs.

The illustrative example is provided as one specific application of 2D to 3D conversion pursuant to the present invention, and is one in which domain-specific priors (or knowledge of the camera location, known sporting field and stadium geometry and appearance, player heights, orientation, etc.) facilitate the automation of the conversion process. Further, the illustrative example is provided because sporting events are a prime candidate for stereoscopic viewing, as they are extremely popular, and can benefit from the increased realism that stereoscopic viewing provides.

Pursuant to some embodiments, the 3D conversion is achieved by creating a temporally consistent depth impression by reconstructing a background panorama with depth for each shot (where a "shot" is a series of sequential frames belonging to the same video camera) and modeling players as billboards.

The result is a rapid, automatic, temporally stable and robust 2D to 3D conversion method that can be used, for example, for far-back field-based shots, which dominate viewing time in many sports and other events. For low-angle, close up action, a small number of stereoscopic 3D cameras can be used in conjunction with embodiments of the present invention to provide full 3D viewing of a sporting event at reduced cost.

Features of some embodiments of the present invention will now be described by first referring to FIG. 1, which is a block diagram of a system 100 pursuant to some embodiments. The system 100 is intended to be illustrative of embodiments where more than one video camera is used to capture and produce an event such as a sporting event. In the illustrated embodiment, two video cameras 110 are shown (although those skilled in the art, upon reading this disclosure, will appreciate that embodiments may be used with any number of cameras). System 100 is shown with each of the video cameras 110 in communication with a conversion engine 120 (which may be the same conversion engine 120 for both cameras or it may be a separate engine 120 for each camera 110). The 2D video signal output from each camera 110 is provided to the conversion engine 120 via a wire or wireless communication link such as a serial interface, a linked fiber transceiver or any combination thereof. The 2D video signal may also be provided to 2D production equipment 140 such as a production switcher located locally at a production truck or remotely at a production studio.

The conversion engine 120 operates to convert the received 2D video signal to a 3D or stereoscopic representation of the 2D video signal. The output of the conversion engine 120 is referred to in FIG. 1 (and elsewhere herein) as a 3D video signal, although those skilled in the art will appreciate that it is not an exact 3D scene reconstruction, meaning it is not exactly two video streams captured from a stereoscopic camera, but rather two video streams that are derived from the one input video stream and are designed to be a temporally consistent estimation of stereoscopic pair so that stereo viewing artifacts are reduced. The 3D video signal output from the conversion engine 120 is provided to 3D production equipment 130 such as a 3D enabled production switcher that is either local to the system 100 or remotely located at a production facility. The 3D production equipment 130 is used to produce video and audio for broadcast. The 3D production equipment 130 may also receive video data from other video cameras, including 3D video cameras 150. In some embodiments, the conversion equipment 120 and the 3D production equipment 130 may be co-located or provided as a single device or set of devices. In one illustrative embodiment, a hybrid system for the creation of stereographic video of an event may include several 2D video cameras 110 as well as several 3D video cameras 150. In the illustrative example involving the production of a broadcast of a soccer match, two far-field 2D video cameras 110 (coupled to one or more conversion engines 120) may be used in conjunction with several stereoscopic 3D video cameras 150 located on the field. The combination of the 2D video cameras 110, conversion engines 120, and 3D video cameras 150 can be used to produce a stereographic broadcast at lower cost than if a full complement of 3D video cameras and equipment were used.

In some embodiments, different cameras 110 may be aimed at an event field from two different angles. For example, each video camera 110 may be an instrumented hard camera that can be dynamically adjusted (e.g., via pan and tilt motions). In the illustrative example where the system 100 is used to capture video of a live soccer event, a first video camera 110 may be located at one end of a soccer field, and the second video camera 110 may be located at the other end of the soccer field, each providing a different view of the field.

Each of the video cameras 110 that are configured to provide video data to a conversion engine 120 may be any device capable of generating a video feed, such as a Vinten® broadcast camera with a pan and tilt head or the like. According to some embodiments, the video cameras 110 may be an "instrumented" video camera adapted to provide substantially real-time information about dynamic adjustments being made to the instrumented video camera. As used herein, the phrase "dynamic adjustments" might refer to, for example, a panning motion, a tilting motion, a focal change, or a zooming adjustment being made to a video camera (e.g., zooming the camera in or out). Alternatively, these dynamic adjustments may be derived based on analysis of the 2D video in the conversion engine 120.

Pursuant to some embodiments, each or all of the conversion engines 120 are configured to perform conversion processing on 2D video data received from their associated video cameras 110.

In general, each conversion engine 120 operates on the 2D video data to separate static and dynamic parts of each scene and process them each using specific methods which will be described further below. Embodiments provide desirable results for wide field shots and utilize certain assumptions about the image content of each video feed. Processing of the conversion engine 120 includes receiving and identifying regions within the input images and then segmenting or categorizing each region as either part of a static background (such as the soccer field, and stands) or moving players (the soccer players, referees, etc.). Then, a background panorama is constructed from the whole shot using a classical mosaicing approach, assuming a fixed panning camera for the homographies used to generate the panorama. From this, a depth map is created for the whole panorama using assumptions about the planar structure of the field, and a heuristic, but sufficiently accurate model for the background, which is explained in more detail below. Background depth maps for each frame can then be computed by an inverse projection from the panorama depth map using the previously computed homographies. These depth maps are designed to be temporally stable and consistent throughout the shot. Then, an improved definition of the player segmentation is made considering the background panorama, and each segmented player is represented as a "billboard", where a "billboard" is generally used herein to refer to a two dimensional area containing a player or other dynamic element. For example, a billboard may be an area or region encompassing a player defined by continuous or related segments defined by image processing as described further below. The depth of the billboard in relation to the panorama is derived from the billboard's location within the background model. Ambiguities in segmentation are then corrected so as to not cause noticeable artifacts. Finally, stereo views are rendered with disocclusions inpainted from known background pixels. Each of these processing steps will be described in further detail below by reference to the process of FIG. 2, and the illustrations of video images in FIGS. 3-7.

Figure 4:
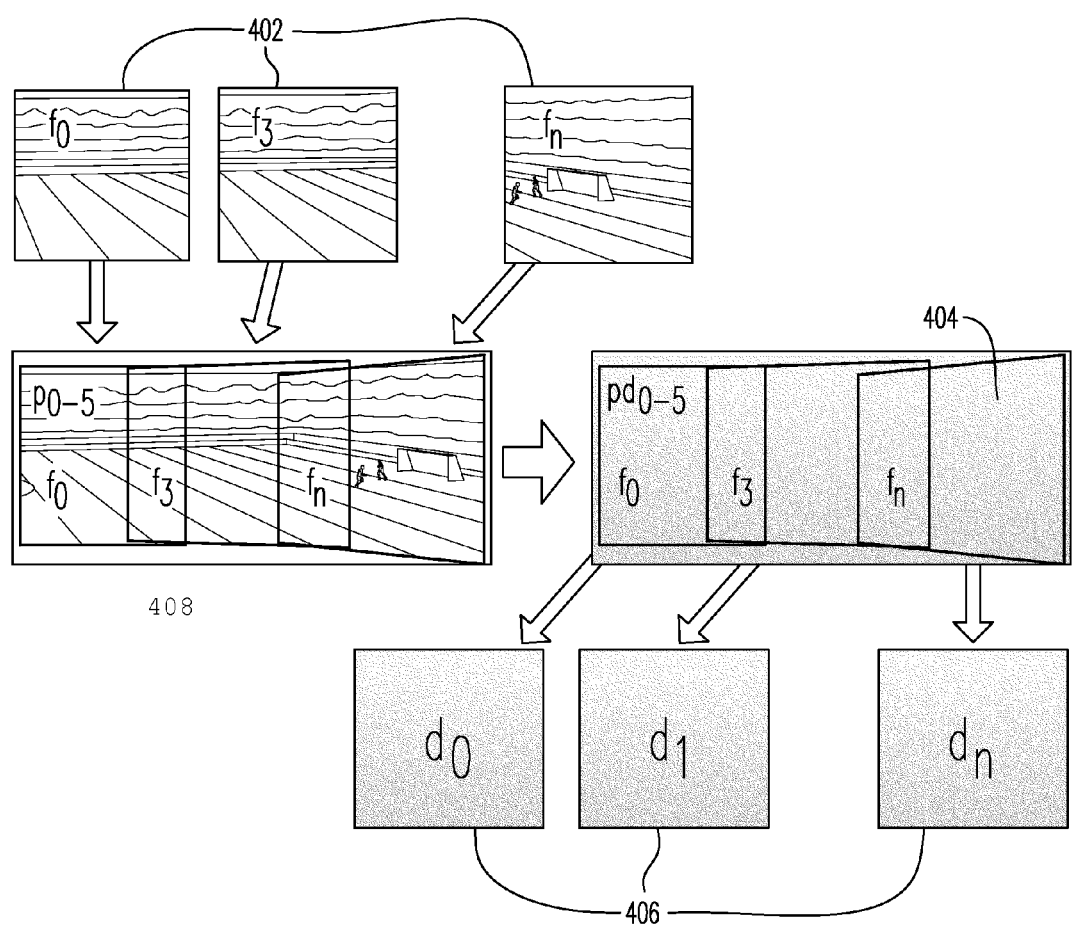

In general, embodiments follow a general processing pipeline as shown in Table 1 below, and as illustrated in the depiction of the video images in FIG. 4. Processing, in some embodiments, follows several steps, with data inputs and outputs at each step as shown in Table 1.

TABLE 1

| Segmentation | Homographies | Panorama | Depth Projection | Billboards (FIG. 5) | Rendering |
|---|---|---|---|---|---|
| In: RGB Color Image<br>Out: [0, 1] label vector per pixel | In: Correspondences for sparse pixels.<br>I1(x1, y1) = I2(x2, y2)<br>Out: 3 × 3 homography matrix mapping the image to the panorama | In: RGB Images and Homographies<br>Out: single panorama per shot | In: Single RGB Image<br>Out: Grayscale depth map of background, same size as input image. | In: Depth map and player segmentation<br>Out: New depth map with players popped out | In: RGB Image and final depth map<br>Out: Stereoscopic image pair |

Pursuant to some embodiments, the processing arriving at the panorama processing step may be performed using any of a number of techniques. In general, if the homographies are known, they may be used to map a set of images together, allowing the conversion engine 120 to warp all of the images (from the image frames associated with a single panorama) into a common coordinate space, for combination into a panorama image (as shown in the middle-left of FIG. 4).

The processing performed by each conversion engine 120 will now be described by reference to FIG. 2 which is a flow diagram that illustrates a method that might be performed, for example, by some or all of the elements described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

Figure 2:
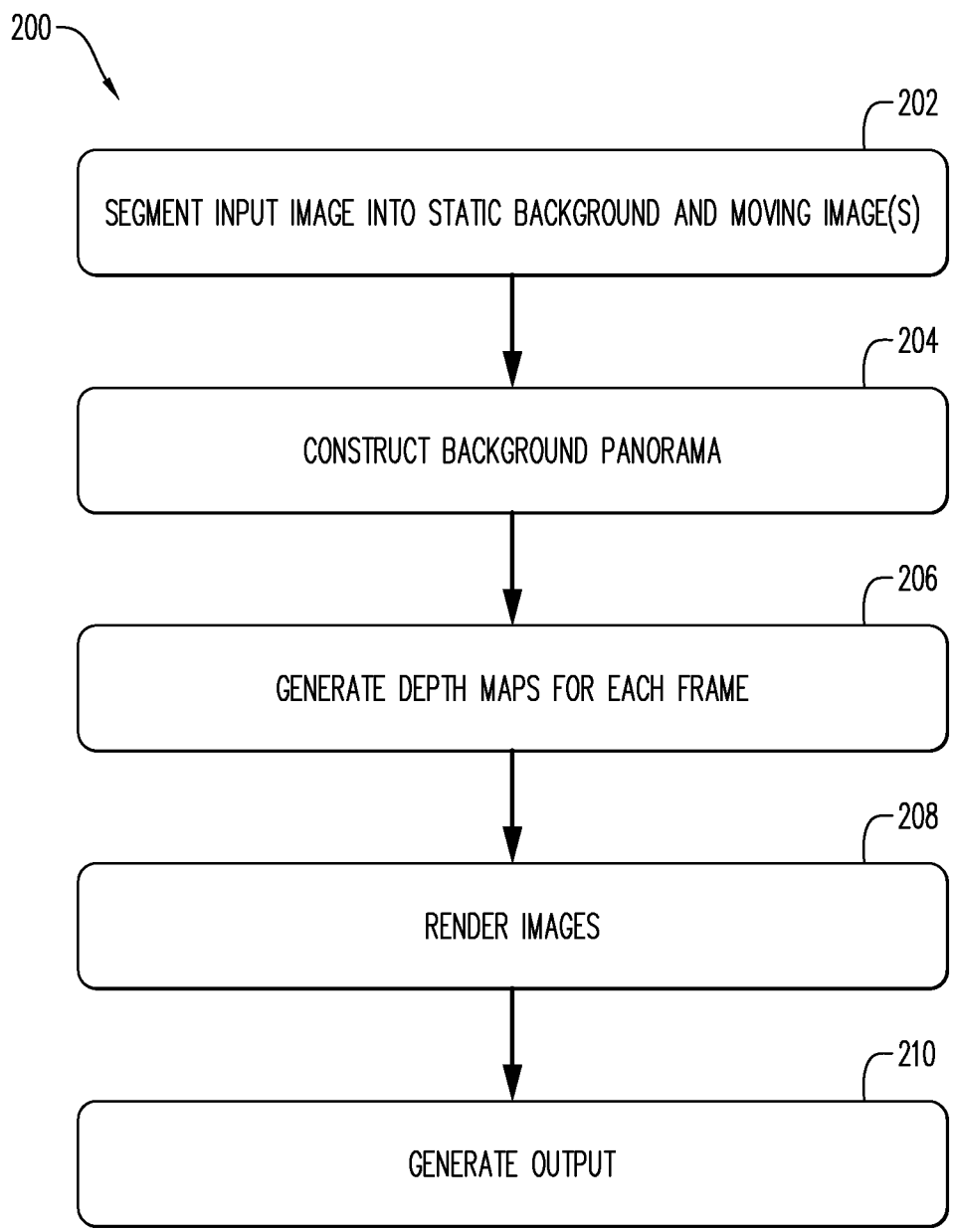
FIG. 2 is a flow chart of a method in accordance with some embodiments of the present invention.

The processing of FIG. 2 may be performed on video feed data received from a video camera 110. As used herein, the phrase "video feed" may refer to any signal conveying information about a moving image, such as a High Definition-Serial Data Interface ("HD-SDI") signal transmitted in accordance with the Society of Motion Picture and Television Engineers 292M standard. Although HD signals may be described in some examples presented herein, note that embodiments may be associated with any other type (format) of video feed, including a standard broadcast feed. In general, the video feed provided to a conversion engine 120 is a monoscopic or 2D video feed.

Processing of a received video feed begins at 202 where the conversion engine 120 operates on the feed to segment regions within the input images into static (such as background) and dynamic or moving image regions. In one embodiment, to perform the segmentation, a classifier such as a standard support vector machine (SVM) may be used that is trained on a representative database of field (or other background) and player appearances. An example of an SVM that may be used with desirable results is the SVM described in "Support Vector Networks", Machine Learning, vol. 20, no. 3, pages 273-297 (1995), the contents of which are hereby incorporated by reference in their entirety for all purposes. Those skilled in the art, upon reading this disclosure, will appreciate that any method that classifies (or segments) each pixel in the video image as either a projection of a static background (e.g. the field) or a projection of a dynamic object (e.g. player, referee, etc.) may be used in step 200. For example, the segmentation may be performed using supervised or unsupervised classifiers such as linear and quadratic classifiers, neural-networks, and k-nearest neighbors.

In some embodiments, processing at 202 includes receiving as input a plurality of descriptor vectors (e.g., where each pixel in an image is associated with a descriptor vector). Each descriptor vector may specify the RGB attributes of its associated pixel. The output of the segmentation processing may include a plurality of label vectors per pixel. In some embodiments, each label is stored as an integer to identify the classification or segmentation. For example, a class of "foreground background" may be labeled as (0,1), while the class of "foreground field and crowds" may be labeled as (0,1,2). Those skilled in the art will appreciate that other kinds of foreground/background segmentation algorithms may be used.

Figure 3:
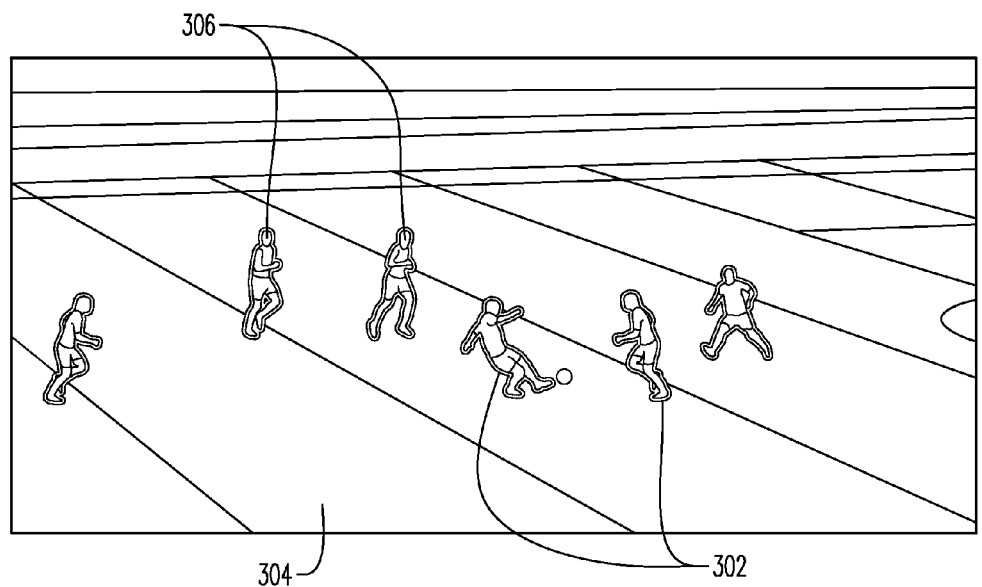
FIGS. 3-7 are illustrations of video images associated with intermediate outputs of the method of FIG. 2.

Once the segmented regions are identified and connected, a small window may be drawn around each segmented region resulting in a view such as that depicted in FIG. 3. For example, a vector of RGB colors in a small window around each pixel is used as a descriptor for the SVM. An illustration of this step is shown in FIG. 3, where an image captured by a video camera 110 is shown in which the dynamic portions of the image (the players 306) are shown with a small window or foreground outline around each player (shown in the image as item 302). The small window 302 around each player 306 separates the dynamic portions of the image from the static background 304. After the background panorama is created (in processing step 204), player segmentation is refined, exploiting background information from the panorama.

Processing continues at 204 where the conversion engine 120 is operated to construct a background panorama. An overall objective of the process 200 is to achieve temporal stability and consistency, as this allows the conversion engine 120 to produce convincing 2D to 3D conversions. An important step in the process 200 to achieve such temporal stability and consistency is the use of a panorama as illustrated in FIG. 4. As shown in FIG. 4, processing at step 204 includes the creation of a panorama 408 using video mosaicing. The creation of the panorama includes first computing homographies as well as a homography matrix mapping the image to a panorama and then generating a single panorama per shot.

Pursuant to some embodiments, a depth map 404 is created for the panorama 408 yielding a complete background model consisting of the depth map 404 and the panorama 408. Depth maps 406 for the corresponding frames 402 are then extracted from the background depth map 404—using the corresponding inverse homography projections.

In some embodiments, the depth maps 406 are generated using an inverse homography projection in which $T_{i,j}$ is the homography transform (represented by a 3×3 matrix) that projects frame i onto the plane of frame j. Processing to generate the depth maps generally involves first computing homographies Ti,i−1 (e.g., using a method such as that described in "Good Features to Track", IEEE Computer Society Conference on Computer Vision and Pattern Recognition, June 1994, pp 593-600).

To compute homographies between two images (or between a panorama and an image), the conversion engine 120 identifies a "sparse" series of points (where "sparse" generally means fewer than 1 point per pixel) that contain correspondence information between the two images. The conversion engine 120 then operates to solve a linear system of equations to compute an optimal homography describing the warping between the two images. For example, the conversion engine 120 may take a series of vectors of 2D point coordinates from the two images. Each vector V1, V2 is the same size, and each (x,y) pair corresponds to the image coordinates of a single scene point in either image (e.g., such as V1: [x1, y1, x2, y2, x3, y3, . . . ], V2: [x1, y2, x2, y2 x3, y3]). As an output of the homography processing, the conversion engine 120 may generate a series of 3×3 homography matrices.

Next, a panorama 408 is created using the accumulated homography $T_{i,0}=T_{i-1,0}*T_{i,i-1}$, $T_{0,0}=I$. This is used to warp all images i onto the first image plane. This homography $T_{i,0}$ is identified as $T_i$. Given this panorama 408, a consistent sequence-wide depth map 404 is created. For a specific frame 402, processing continues to transform the sequence depth map 404 into its local coordinates using inverted homographies $T_{i-1}$ which provides the background depth map for each frame 402.

Although the described process uses only frame-to-frame information (which leads to a small accumulated error over the whole sequence), applicants have discovered that it achieves sufficient quality for many conversions. Alternatively, any more sophisticated panorama generation process can be applied (e.g., such as processing involving long-term estimates or image-to-panorama registration). This is because the panorama image is only used for the construction of per-frame temporally stable depth maps, and not to reproject output color images. The result is a process that provides quality and temporally stable depth maps that can be generated quickly with relatively low processing overhead.

Processing continues at 206, where a depth model of the panorama 408 is created. This can be done with automatic processes like the Make3D process (available under a Creative Commons License at http://make3d.cs.cornell.edu/index.html). The "depth model" (or "background model") of the panorama 408 may also be created based on prior knowledge about stadium geometry, or even created by hand for each video camera 110 in the event the video camera 110 is stationary. Applicants have further discovered that the use of a simple heuristic may produce perceptually high quality results. A linear depth ramp is assigned to the panorama which, in terms of geometry, is essentially approximating the model of the stadium background as a smooth upwards-curve. That means that a simple, a priori defined depth model is assigned to the panorama, which is justified by the given conditions of purely rotation and zooming camera operation, and a priori knowledge about scene geometry, which is a ground plane with tribunes behind. A linear depth ramp, although not fully accurate, approximates this geometry well enough for the purpose of stereo rendering, as the virtual camera positions are relatively close to original camera positions compared to the distance of the scenery. The process can also work on the fly.

Figure 5:
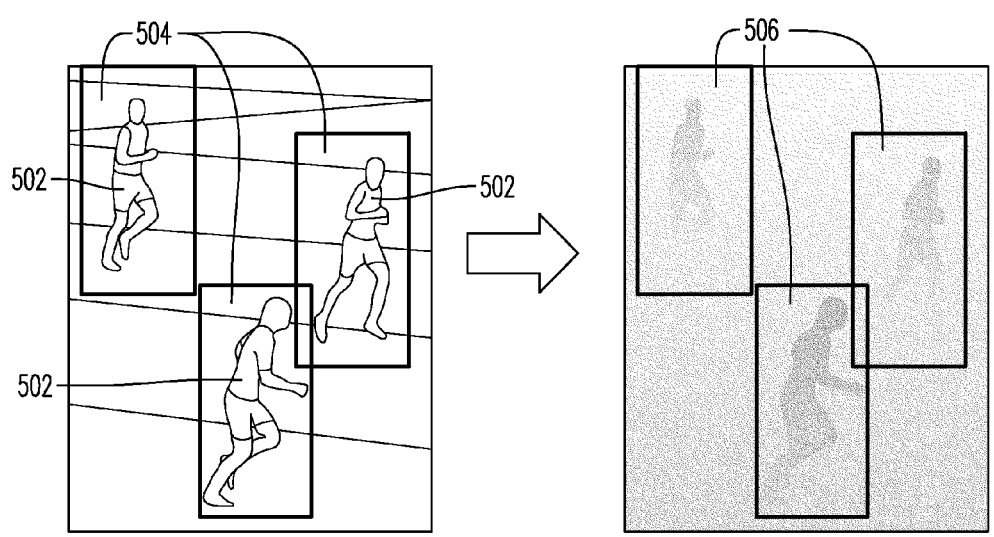

Processing continues at 206 where depth maps 406 for each frame 402 are generated. In this processing, the depth values for the dynamic images (e.g., the segmented foreground players) are assigned. This is done by assuming that the camera is vertically aligned and that players are in close contact with the ground. Players are then modeled as billboards whose depth is assigned from the per-frame depth map at the lowest point (in image space) of the segmented region (illustrated as items 506). As illustrated in FIG. 5, each depth is assigned from per-frame depth maps. Preferably, in some embodiments, each player (shown as item 502 in FIG. 5) is segmented into its own region 504 or "billboard". However, multi-object segmentation is a difficult problem in the face of occlusions and changing object appearances. In addition, in many broadcast events (such as sporting events) it is common for multiple players to group tightly together and move in similar directions, further confusing segmentation techniques. These errors cause the 3D artifact that players that are in such clusters and are higher up in the image plane, will have the appearance of floating over players below them, as their assigned billboard depth does not correspond to their on-field location.

Figure 6:
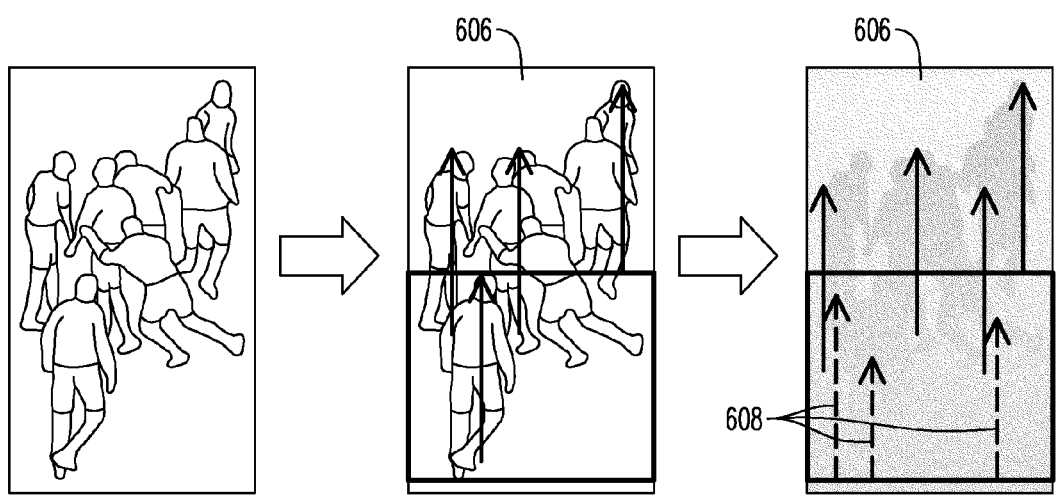

An illustration of multiple players in the same billboard is shown in FIG. 6. To compensate for such groupings, the depth is modified for upper parts of the segmented regions 606, taking data associated with average player heights into account. More particularly, Applicants have discovered that it is possible to alleviate the 3D artifact that players higher up in the image plane are floating over the players below them by using application-specific priors. Processing in such situations include first computing a per-frame estimated player size. This is determined by finding the average segmented region size in the reconstructed background panorama, and projecting this into each frame using $T_{i-1}$. As the homographies carry information about video camera parameters (including model and physical sizes), embodiments allow the video camera to be operated with a variable zooming level while still allowing the conversion of 2D video data pursuant to the present invention. Another way to estimate a player height in image space is to calculate it based on a camera model if available.

Regions or billboards 606 that are above this size threshold are initially assigned the depth of the bottom player in the group, leading to the aforementioned player "floating-on-heads" effect. The conversion engine 120 is then operated to modify the depth billboard above the computed per-frame average player height. For this processing, in some embodiments, it may be assumed that parts of the depth billboard higher than this threshold belong to players further back and the conversion engine 120 may then compute a corresponding virtual foot position (shown as the arrows marked as 608 in FIG. 6). Players in front remain at the original assigned depth value, while players behind are smoothly blended into the depth computed by their virtual foot positions. That is, for each depth pixel above the rectangle in 606, the depth value of the virtual foot position in the background is used. The virtual foot position is given by the length of the arrow in 606.

Applicants have discovered that such billboard rendering is sufficient, in many sporting or event broadcasts, given the limited distance of virtual views to be rendered and the limited player size. Those skilled in the art will appreciate that more complex processing would be necessary to allow for wide range free viewpoint navigation.

Once the depth maps have been generated for each frame in a video feed, processing continues at 208 where images are rendered. In general, a virtual or generated image is rendered which, when viewed in conjunction with the original image, provides a stereographic view of the image. In order to render the virtual images, the conversion engine 120 operates to convert the final corrected depth values into pixel displacements. In some embodiments, an operator of the conversion engine 120 may select the desired virtual interaxial and convergence settings. Once those settings have been selected, the conversion engine 120 is operated using standard depth image based rendering, such as the rendering described in "Depth-image-based Rendering (DIBR), Compression and Transmission for a New Approach on 3D-TV", SPIE Stereoscopic Displays and Virtual Reality Systems XI, January 2004, pp 93-104, the contents of which are hereby incorporated in their entirety herein. Processing at 208 may include projecting the single view into two views at each side so as to reduce the size of disoccluded holes in any one image. DIBR takes an input color image and a corresponding per pixel depth map as input. Each of the color pixels is projected into 3D space using the related depth value and a priori known camera calibration information. The resulting 3D point cloud can then be reprojected into an arbitrary virtual view plane, generating a synthesized output image. Usually, this process is combined and simplified for efficiency.

Figure 7:
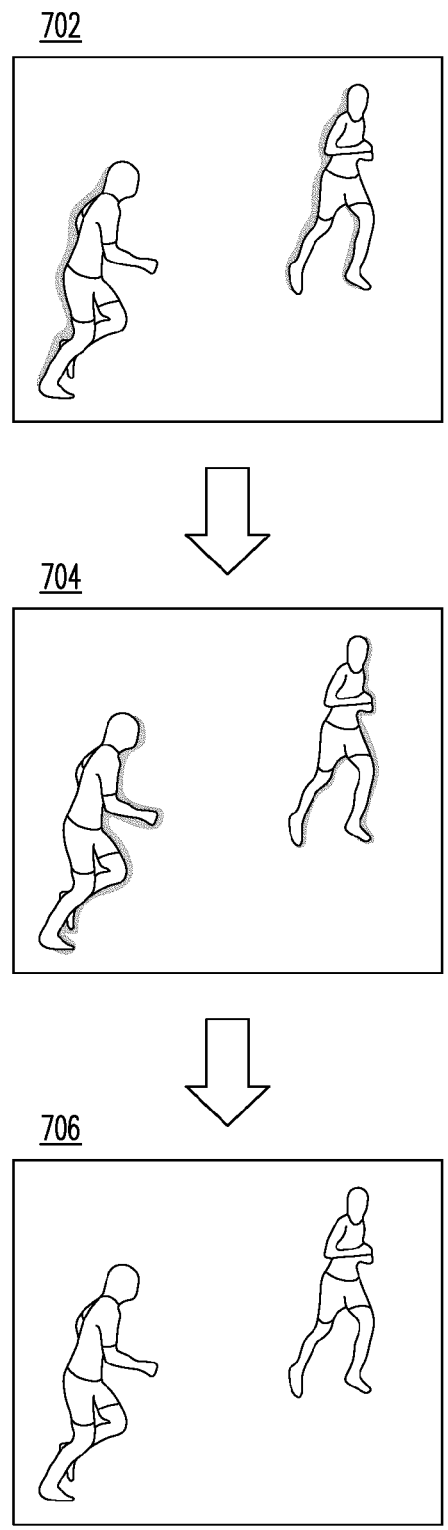

To correctly render occluded regions the conversion engine 120 renders the images in depth-order. Disocclusions can lead to holes in the resulting virtual images as shown in FIG. 7 items 702 (showing disocclusions for the left eye) and 704 (showing disocclusions for the right eye). These holes can either be filled by background extrapolation around the billboard or by using precomputed background information. Precomputed background information is available from the panorama generated at 204. In some embodiments where very small disocclusions of a few pixels are experienced (e.g., such as in situations where the distance between the video camera 110 and the player on the field is relatively large, and the distance between the original and the virtual view is relatively small, which is always the case for stereo images), the holes are small and thin. In such situations, the holes can be filled with simple background extrapolation as illustrated in the image 706.

The processing of FIG. 2 is performed on a repeated basis as 2D video data is received from video camera 110. The output is stereoscopic content which may be provided to 3D production equipment 130 for the production of a 3D video feed. The method may also be employed live, where the background mosaic and its depth map are being built in runtime.

Embodiments provide advantages over filming using stereographic cameras, in that the system provides improved control over parameters such as virtual interaxial camera distance and convergence for the synthesized stereoscopic content. This means that producers can easily optimize stereo parameters to minimize visual fatigue across scene cuts, create desired stereo effects for specific scenes, and place on-screen graphics at appropriate depth locations (e.g. augmented reality created by video insertions). Furthermore, stereoscopic errors that are hard to compensate during live filming (such as objects breaking screen borders, which cause stereo framing violations) can be completely avoided. Embodiments provide 2D to 3D conversion using simple and cost effective techniques that produce convincing and desirable results.

Figure 8:
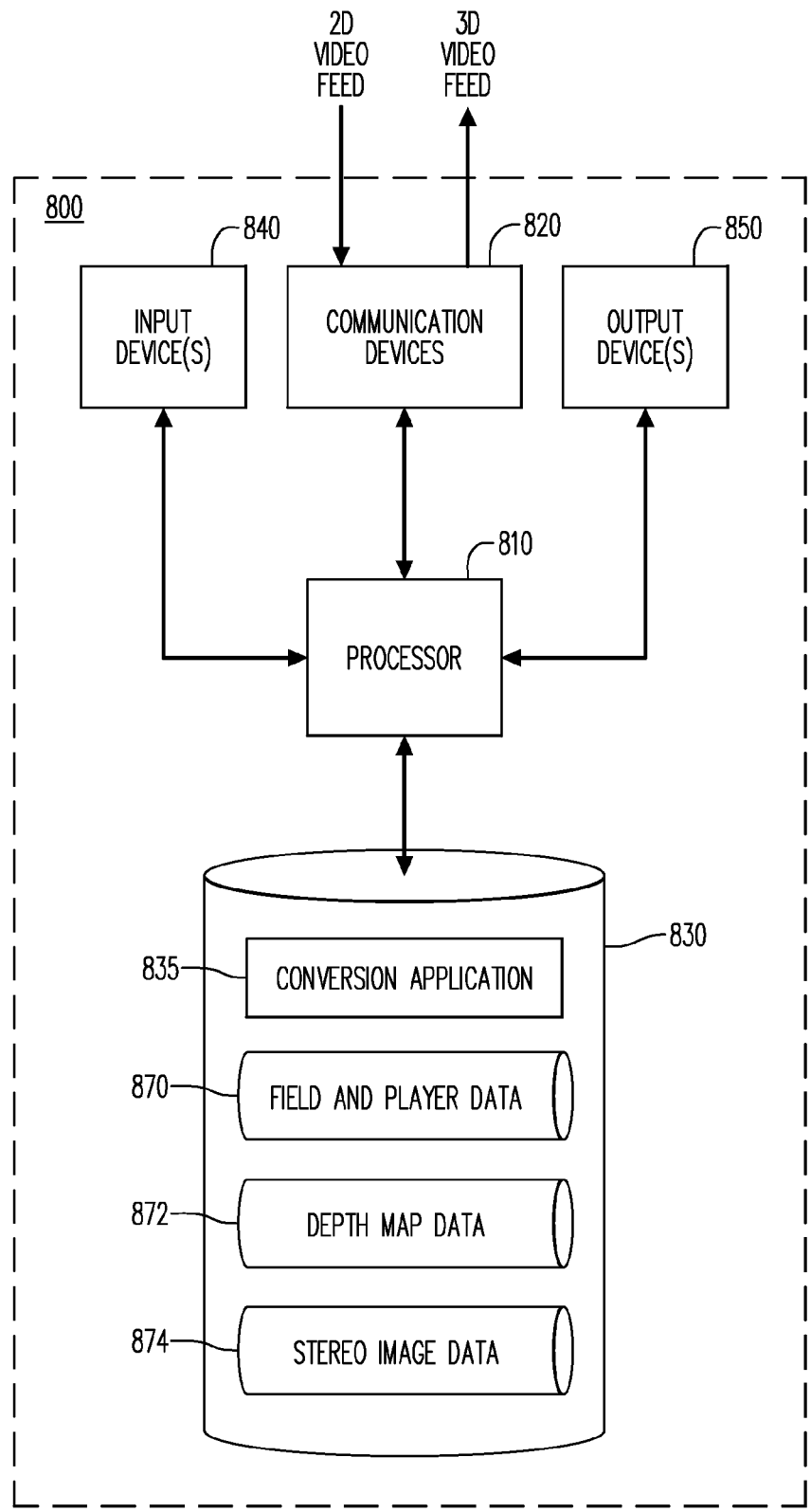
FIG. 8 is a block diagram of a conversion engine in accordance with some embodiments of the present invention.

FIG. 8 is a block diagram of a conversion engine 800, such as the engine shown as items 120 of FIG. 1, in accordance with some embodiments of the present invention. As described herein, a number of conversion engines may be deployed for use in conjunction with converting two dimensional video data during the production and broadcast of a given event. For example, in the production and broadcast of a soccer match, several conversion engines 800 may be deployed, one (or more) with each of several fixed location video cameras. In some embodiments, such as one described in conjunction with FIG. 8, the conversion engine 800 may be deployed as a personal computer or similar device. As shown, the conversion engine 800 comprises a processor 810, such as one or more INTEL® Pentium® processors, coupled to communication devices 820 configured to communicate with remote devices (not shown in FIG. 8). The communication devices 820 may be used, for example, to receive a two dimensional video feed (e.g., directly from a video camera such as camera 110 of FIG. 1) and to transmit a three dimensional video feed (e.g., to a production vehicle or to a production facility such as 3D production equipment 130 of FIG. 1).

The processor 810 is also in communication with an input device 840. The input device 840 may comprise, for example, a keyboard, a mouse, or computer media reader. Such an input device 840 may be used, for example, to enter information to control the conversion of 2D data received from a video camera, such as information about field settings, camera set-up, or the like. The processor 810 is also in communication with an output device 850. The output device 850 may comprise, for example, a display screen or printer. Such an output device 850 may be used, for example, to provide information about a conversion or camera set-up to an operator.

The processor 810 is also in communication with a storage device 830. The storage device 830 may comprise any appropriate information storage device, including combinations of magnetic storage devices (e.g., hard disk drives), optical storage devices, or semiconductor memory devices such as Random Access Memory (RAM) devices and Read Only Memory (ROM) devices.

The storage device 830 stores a conversion engine application 835 for controlling the processor 810. The processor 810 performs instructions of the application 835, and thereby operates in accordance any embodiments of the present invention described herein. For example, the processor 810 may receive two dimensional video data from a video camera associated with the conversion engine. The processor 810 may then perform processing to cause the two dimensional data to be converted to a three dimensional video data feed. The processor 810 may then transmit the converted video feed to 3D production equipment via the communication devices 820.

As used herein, information may be "received" by or "transmitted" to, for example: (i) the conversion engine 800 from other devices; or (ii) a software application or module within conversion engine 800 from another software application, module, or any other source.

As shown in FIG. 8, the storage device 830 also stores a number of items of data (which may include a number of other types of data not specifically shown in FIG. 8), including field and player data 870 (used to segment video data into static and dynamic parts, etc.), depth map data 872 (used, for example, to extract depth maps from each frame from a panorama and to generate player billboards), and stereo image data 874 (used, for example, to convert final corrected depth values into pixel displacements). Those skilled in the art, upon reading this disclosure, will appreciate that the identification, illustration and accompanying descriptions of the data used herein are exemplary, and any number of other database and data storage arrangements could be employed besides those suggested by the figures.

Some embodiments described herein provide systems and methods for creating stereoscopic footage from monoscopic input of wide field sports scenes. In some embodiments, static background and moving players are treated separately. Embodiments may be used to create high quality conversion results that are in most cases indistinguishable from ground truth stereo footage, and could provide significant cost reduction in the creation of stereoscopic 3D sports content for home viewing.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although a conversion engine 120 that operates primarily on individual frames are described, some embodiments may provide conversion techniques that use tracking information across frames and sequences. Further, while depth assignment assumptions are described for use in sporting environments having a flat field and rising stadium seats, embodiments may further be used in environments with different terrains (such as golf courses, or the like). In such embodiments, some manual interaction may be required to generate depth maps appropriate to the different background structures.

Moreover, although specific hardware and data configurations have been described herein, note that any number of other configurations may be provided in accordance with embodiments of the present invention (e.g., some of the information associated with the databases and engines described herein may be split, combined, or handled by external systems). Further note that embodiments may be associated with any number of different types of broadcast programs (e.g., sports, news, and weather programs).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for converting a two dimensional (2D) video feed into a stereoscopic video stream, comprising:
    identifying, by a conversion engine from a 2D video feed received from one 2D video camera, a current 2D video frame;
    computing homographies for a plurality of pixels of the current 2D video frame and generating a homography matrix to map the current 2D video frame into a panoramic background image constructed based on previous 2D video frames;
    generating, from the panoramic background image, a panoramic background depth map;
    extracting a current frame depth map that corresponds to the current 2D video frame by computing an inverse projection from the panoramic background depth map using the homographies for previous 2D video frames;
    generating an updated current frame depth map comprising at least one billboard representing dynamic content associated with the current 2D video frame, wherein the depth of the billboard is derived from its location within the panoramic background depth map; and
    rendering, by the conversion engine, a stereoscopic image pair based on the current 2D video frame, the updated current frame depth map, and camera information associated with the 2D video camera.

2. The method of claim 1, further comprising:
    providing the stereoscopic image pair to a production switcher for creation of a stereoscopic feed based on the 2D video feed.

3. The method of claim 1, wherein the 2D video stream is received from a video camera located in a fixed position, the video camera having panning, tilting and zooming controls.

4. The method of claim 1, wherein the panoramic background depth map is the same size as the panoramic background image.

5. The method of claim 1, wherein the panoramic background depth map is a grayscale depth map.

6. The method of claim 1, wherein each pixel is assigned a descriptor vector and a label vector, the descriptor vector identifying an RGB value associated with the pixel, and the label vector identifying a type of the pixel, the type identifying the pixel as at least one of a background type and a foreground type.

7. The method of claim 6, further comprising identifying at least a first image segment as a foreground image segment, the foreground image segment containing a plurality of pixels having a label vector identifying a plurality of pixels as being of the foreground type.

8. The method of claim 7, wherein the at least first image segment includes a plurality of foreground type pixels in a connected region.

9. The method of claim 1, wherein the panoramic background image is formed from a set of image frames using an accumulated homography of all of a set of image frames onto a single image plane.

10. The method of claim 1, wherein the panoramic background depth map is generated using known information associated with the geometry of a panoramic background image.

11. The method of claim 1, wherein the rendering the stereoscopic image pair further comprises:
    identifying at least a first disocclusion in a first image segment; and
    replacing the at least first disocclusion with a background image.

12. The method of claim 1, wherein the 2D video stream is received via a high definition serial digital interface signal.

13. The method of claim 2, wherein the production switcher further is provided with at least a first 3D video stream from at least a first 3D video camera, the production switcher creating a stereoscopic stream based on both the 2D video stream and the at least first 3D video stream.

14. A system for generating a stereoscopic video stream, comprising:
    a two dimensional (2D) video camera generating a 2D video stream; and
    a conversion engine, receiving the 2D video stream, the conversion engine processing the 2D video stream to identify a current 2D video frame;
    compute homographies for a plurality of pixels of the current 2D video frame and generating a homography matrix to map the current 2D video frame into a panoramic background image constructed based on previous 2D video frames;
    generate, from the panoramic background image, a panoramic background depth map;
    extract a current frame depth map from the panoramic background depth map;
    extract a current frame depth map that corresponds to the current 2D video frame by computing an inverse projection from the panoramic background depth map using the homographies for previous 2D video frames;
    generate an updated current frame depth map comprising at least one billboard representing dynamic content associated with the current 2D video frame, wherein the depth of the billboard is derived from its location within the panoramic background depth map; and
    render a stereoscopic image pair based on the current 2D video frame, the updated current frame depth map, and camera information associated with the 2D video camera.

15. The system of claim 14, further comprising 3D production equipment, the 3D production equipment receiving the stereoscopic image pair from the conversion engine and transmitting a stereoscopic broadcast including the stereoscopic image pair.

16. The system of claim 15, further comprising at least a first 3D video camera generating a 3D video stream, wherein the 3D production equipment further receives the 3D video stream for production of the stereoscopic broadcast including both the 3D video stream and the stereoscopic image pair from the conversion engine.

17. A video conversion engine, comprising:
    a first communication interface for receiving a two-dimensional (2D) video stream from one 2D video camera;
    a first processor coupled to the first communication interface; and
    a first storage device in communication with the first processor and storing a first application adapted to be executed by the first processor to:

identify a current 2D video frame;

compute homographies for a plurality of pixels of the current 2D video frame and generating a homography matrix to map the current 2D video frame into a panoramic background image constructed based on previous 2D video frames;

generate, from the panoramic background image, a panoramic background depth map;

extract a current frame depth map that corresponds to the current 2D video frame by computing an inverse projection from the panoramic background depth map using the homographies for previous 2D video frames;

generate an updated current frame depth map comprising at least one billboard representing dynamic content associated with the current 2D video frame, wherein the depth of the billboard is derived from its location within the panoramic background depth map; and render a stereoscopic image pair based on the current 2D video frame, the updated current frame depth map, and camera information associated with the 2D video camera.

18. The video conversion engine of claim 17, wherein the first application adapted to be executed by the first processor further is executed to transmit the stereographic image pair to a production switcher for creation of a stereoscopic video stream based on the 2D video feed.

* * * * *